(12) United States Patent
Wang et al.

(10) Patent No.: US 10,003,630 B2
(45) Date of Patent: Jun. 19, 2018

(54) METHOD, APPARATUS AND COMPUTER PROGRAM PRODUCT FOR MANAGING STATIC UNIFORM RESOURCE LOCATOR ACCESS

(71) Applicant: Synology Incorporated, Taipei (TW)

(72) Inventors: Tsung-Wei Wang, Kaohsiung (TW); Jia-Yu Liu, New Taipei (TW); Kan-Yueh Chen, Taoyuan County (TW)

(73) Assignee: SYNOLOGY INCORPORATED, Taipei (TW)

( * ) Notice: Subject to any disclaimer, the term of this patent is extended or adjusted under 35 U.S.C. 154(b) by 765 days.

(21) Appl. No.: 14/485,816

(22) Filed: Sep. 15, 2014

(65) Prior Publication Data

US 2015/0237108 A1 Aug. 20, 2015

(30) Foreign Application Priority Data

Feb. 14, 2014 (TW) .............................. 103104960 A

(51) Int. Cl.
*G06F 15/16* (2006.01)
*H04L 29/08* (2006.01)
*H04L 29/06* (2006.01)

(52) U.S. Cl.
CPC .............. *H04L 67/02* (2013.01); *H04L 67/42* (2013.01)

(58) Field of Classification Search
CPC ................................ H04L 67/02; H04L 67/43
(Continued)

(56) References Cited

U.S. PATENT DOCUMENTS 5,706,507 A 1/1998 Schloss
6,728,767 B1 4/2004 Day
(Continued)

FOREIGN PATENT DOCUMENTS

CN 102752267 A 10/2012
CN 103269313 A 8/2013
(Continued)

OTHER PUBLICATIONS

European Office Action dated Mar. 5, 2018, issued in application No. 15 151 785.1-1222.
(Continued)

*Primary Examiner* — Davoud Zand
(74) *Attorney, Agent, or Firm* — McClure, Qualey & Rodack, LLP

(57) ABSTRACT

A method for managing static Uniform Resource Locator (URL) access, an associated apparatus, and an associated computer program product are provided, wherein the method includes the steps of: receiving a URL request from a browser running on another electronic device, wherein the URL request includes a static URL, and the static URL is utilized for accessing a specific web page on a specific web server; sending request information representing the URL request to a control server, wherein the control server stores registered information of each web server of at least one web server, and the at least one web server includes the specific web server; receiving response information corresponding to the request information from the control server; and controlling the browser to perform a test operation according to the registered information of the specific web server, in order to selectively control web page access of the browser.

19 Claims, 5 Drawing Sheets

(58) Field of Classification Search
USPC .................. 709/201, 202, 203, 208, 211
See application file for complete search history.

(56) References Cited

U.S. PATENT DOCUMENTS

| | | | |
|---|---|---|---|
| 2002/0147638 A1* | 10/2002 | Banerjee | G06Q 30/0255 705/14.53 |
| 2003/0038839 A1 | 2/2003 | Simpson | |
| 2008/0263126 A1 | 10/2008 | Soman | |
| 2011/0145426 A1* | 6/2011 | Miyajima | H04L 63/0272 709/230 |
| 2011/0202755 A1* | 8/2011 | Orsini | H04L 63/029 713/151 |
| 2011/0307710 A1* | 12/2011 | McGuire | G06F 21/6263 713/183 |
| 2013/0103757 A1* | 4/2013 | Mitchell | G06Q 50/01 709/204 |
| 2013/0227078 A1* | 8/2013 | Wei | H04L 67/02 709/219 |
| 2014/0173744 A1* | 6/2014 | Borohovski | G06F 21/577 726/25 |
| 2014/0344890 A1* | 11/2014 | Warrick | H04L 63/0281 726/1 |
| 2015/0186521 A1* | 7/2015 | Yavilevich | H04L 67/02 707/710 |
| 2016/0285976 A1* | 9/2016 | Chan | H04W 4/001 |

FOREIGN PATENT DOCUMENTS

| | | |
|---|---|---|
| EP | 2 081 120 A1 | 7/2009 |
| TW | 200637263 | 10/2006 |
| WO | 0131855 A2 | 5/2001 |
| WO | 0133371 A1 | 5/2001 |

OTHER PUBLICATIONS

Reverse Connection;"Wikipedia; https://en.wikipedia.org/w/index.php?title=Reverse_connection&oldid=544787006"; Jun. 2015; pp. 1.

* cited by examiner

METHOD, APPARATUS AND COMPUTER PROGRAM PRODUCT FOR MANAGING STATIC UNIFORM RESOURCE LOCATOR ACCESS

BACKGROUND OF THE INVENTION

1. Field of the Invention

The present invention relates to utilizing a Static Uniform Resource Locator (URL) to access the control of a plenty of scattered inner web servers, and more particularly, to a method, apparatus and computer program product arranged for managing the static URL access.

2. Description of the Prior Art

Utilizing a static URL to perform the web page access is convenient for users. Further, in typical conditions, static URLs are more likely to appear in the search result of a search engine. This helps to raise visibility of web pages. Hence, how to provide the service of a set of web pages having non-static URLs to users through static URLs is an important issue, wherein the number of this set of web pages might be large, e.g., tens of thousands of web pages.

Some schemes are provided in related arts. According to a conventional scheme, a set of reverse tunnels may be created for each of web servers in advance, and each of virtual hosts is assigned to a corresponding reverse tunnel. In this way, no matter where a user is located, the user can access any of the web servers located behind the firewall through reverse proxy servers. Hence, the existence of the firewall does not block the users from accessing these web servers. However, some problems, such as some side effects, are generated. For example, even when the user and these web servers are located in the same intranet, the user still has to access through these reverse proxy servers, which slows the access speed and increases loads of these reverse proxy servers. For another example, since these reverse tunnels have to be ready in advance for the user to use at any time, when there are too many idle servers among the reverse proxy servers, there would be much consumption of the system resources.

According to another conventional scheme, the user may directly obtain information of a set of reverse tunnels from a system which records server information, and directly use the set of reverse tunnels to access a corresponding set of web pages. However, some problems, such as some side effects, are generated. For example, the health condition of the reverse tunnels cannot be detected. More particularly, when some reverse tunnels become invalid, the architecture implemented based on this conventional scheme cannot adopt corresponding measures to fix the problem, which reduces the smoothness of the user experience. For another example, when the set of reverse tunnels are not constructed using the standard port 80 or port 443, the user may be unable to access the set of web pages due to the access restriction enforced by the firewall.

It can be seen from the above that the conventional schemes cannot provide stable static URL access service to users without generating side effects. Hence, there is a need for a novel method capable of improving performance of a web page access management apparatus.

SUMMARY OF THE INVENTION

Hence, one of the objectives of the present invention is to provide a method, apparatus and computer program product arranged for managing static URL access, so as to solve the above issue.

Another objective of the present invention is to provide a method, apparatus and computer program product arranged for managing static URL access, so as to provide stable static URL access service to users without generating side effects.

Another objective of the present invention is to provide a method, apparatus and computer program product arranged for managing static URL access, so as to improve performance of a web page access management apparatus.

According to at least one preferred embodiment of the present invention, a method for managing static Uniform Resource Locator (URL) access is provided. The method is applied to an electronic device, and includes the steps of: receiving a URL request from a browser running on another electronic device, wherein the URL request includes a static URL, and the static URL is utilized for accessing a specific web page on a specific web server; sending request information representing the URL request to a control server, wherein the control server stores registered information of each web server of at least one web server, and the at least one web server includes the specific web server; receiving response information corresponding to the request information from the control server, wherein the control server generates the response information according to the request information, and the response information indicates registered information of the specific web server; and redirecting the browser to a test page, to control the browser to perform a test operation according to the registered information of the specific web server to generate a test result, in order to selectively allow the browser to directly or indirectly access the specific web page. For example, the test page may be a JavaScript test page. For another example, the test page may be a flash test page.

In addition to the above method, the present invention also correspondingly provides an apparatus for managing static Uniform Resource Locator (URL) access. The apparatus includes at least apart of an electronic device, and includes a network control module and a processing circuit. The network control module is arranged to provide a network service to the apparatus. The processing circuit is coupled to the network control module, and arranged to control the operation of the electronic device, to perform method based on the network service, wherein the processing circuit includes at least one processor, and the method includes the steps of: receiving a URL request from a browser running on another electronic device, wherein the URL request includes a static URL, and the static URL is utilized for accessing a specific web page on a specific web server; sending request information representing the URL request to a control server, wherein the control server stores registered information of each web server of at least one web server, and the at least one web server includes the specific web server; receiving response information corresponding to the request information from the control server, wherein the control server generates the response information according to the request information, and the response information indicates registered information of the specific web server; and redirecting the browser to a test page, to control the browser to perform a test operation according to the registered information of the specific web server to generate a test result, in order to selectively allow the browser to directly or indirectly access the specific web page. For example, the test page may be a JavaScript test page. For another example, the test page may be a flash test page.

In addition to the above method and apparatus, the present invention also correspondingly provides a computer program product. The computer program product includes a program code which is arranged to indicate at least one processor to perform the above method.

One advantage provided by the present invention is that, compared to the related arts, the method, apparatus and computer program product may raise the performance of the web page access managing apparatus. For example, when a the service of web pages including non-static URLs need to be provided to users through static URLs, according to portal server implemented by the present invention, the high quality static URL access service can be maintained. For another example, when it is required to replace one web server among the aforementioned at least one (e.g., one or multiple) web server, although the amount of the set of web pages may be large (even more than 10000), the internet administrator may easily maintain the high quality static URL access service by controlling this web server to automatically register the latest registered information to the control server again.

Further, the method, apparatus and computer program product of the present invention are capable of providing efficient web page access without generating side effects. For example, when the user and these web servers are located in the same Intranet, the browser may directly access (or be connected to) the specific web page; otherwise, utilizing the reverse tunnel created by the control server through the at least one web server. The apparatus of the present invention, such as the portal server, allows the browser to indirectly access the specific web page. Regarding creating the reverse tunnel, the control server may notify the aforementioned at least web server after receiving a notification of the portal server, so as to utilize the aforementioned at least one web server to create the reverse tunnel. More particularly, no matter the browser accesses the specific web page directly or indirectly, the user may use the same URL, and does not have to replace any part in the static URL, such as partial strings in the URL.

Moreover, the method, apparatus and computer program product of the present invention are capable of providing static URL access service to the user. More particularly, under a situation that the internet is unstable and easily to be disconnected, the apparatus of the present invention, such as the portal server, may automatically restore the connection as soon as detecting the disconnection, wherein during the period of recreating the reverse tunnel, the user at most feels delay in the specific web, but does not feel the specific web hanging there just like the browser crashes.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
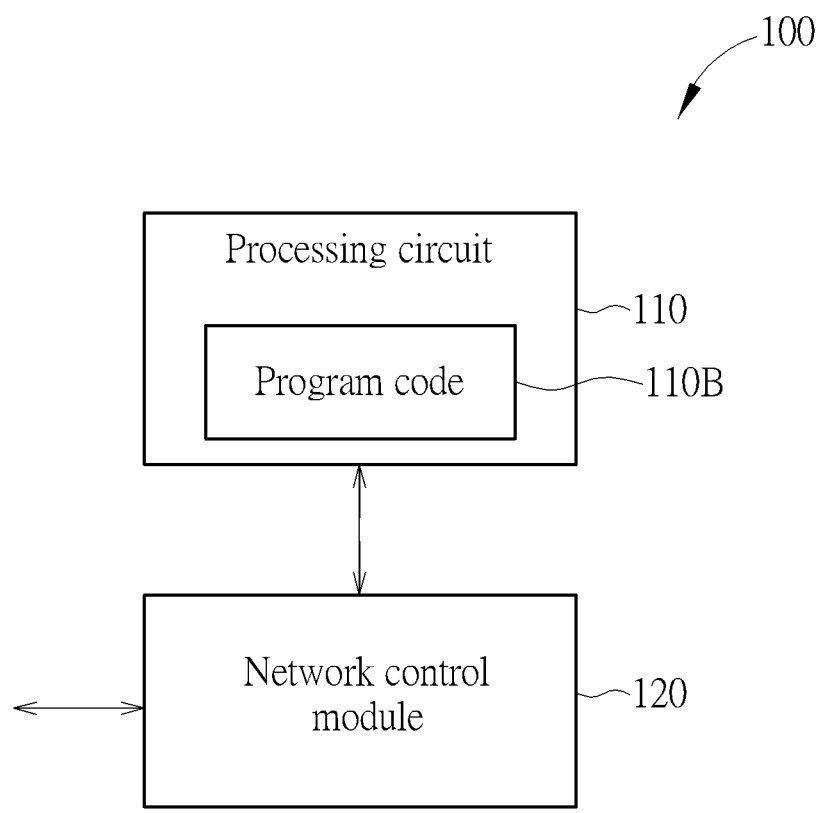
FIG. 1 is a diagram illustrating an apparatus arranged for managing static Uniform Resource Locator (URL) access according to a first embodiment of the present invention.

Please refer to FIG. 1, which is a diagram illustrating an apparatus 100 arranged for managing static Uniform Resource Locator (URL) access according to a first embodiment of the present invention, wherein the apparatus 100 may include at least a portion (e.g., part or all) of an electronic device. For example, the apparatus 100 may be a circuitry system in the electronic device. For another example, the apparatus 100 may be the entire electronic device. In this embodiment, the electronic device may include at least one server (e.g., one or more servers), such as a portal server. More particularly, the electronic device may be the portal server. However, this is merely for illustrative purposes, and not meant to be a limitation of the present invention. According to some modifications of this embodiment, in addition to the aforementioned portal server, the electronic device may further include a control server.

As shown in FIG. 1, the apparatus 100 includes a processing circuit 110 and a network control module 120, wherein the processing circuit 110 and the network control module 120 are coupled to each other. According to this embodiment, the network control module 120 is used to provide a network service to the apparatus 100, so as to maintain the operation of the electronic device. For example, the network control module 120 may include one or more network interface circuits. Further, the processing circuit 110 may include at least one processor arranged to execute a program code 110B, and the processing circuit 110 executing the program code 110B is used to control the operation of the electronic device, in order to perform static URL access management based on the network service. More particularly, the processing circuit 110 includes a static URL access management module (not shown in FIG. 1) arranged for managing the static URL access. For example, the static URL access management module may be at least one program module included in the program code 110B, such as at least one software module, wherein the program code 110B may represent a program running on the aforementioned at least one server. However, this is merely for illustrative purposes, and not meant to be a limitation of the present invention. According to some modifications of this embodiment, the program code 110B may be embedded in the processing circuit 110, and the static URL access management module may be a hardware circuit, such as at least a portion (e.g., part or all) of the processing circuit 110.

Figure 2:
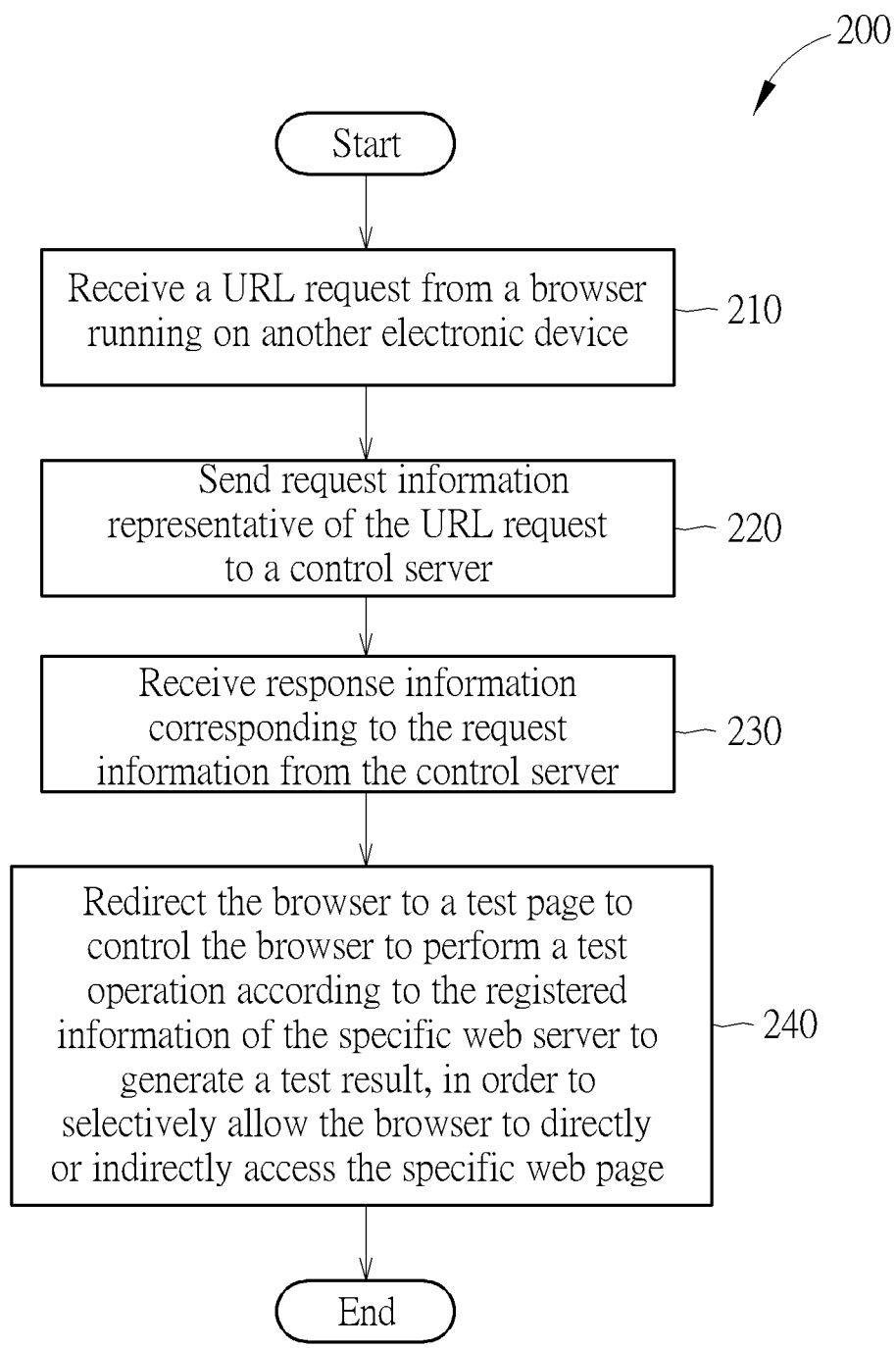
FIG. 2 is a flowchart illustrating a method arranged for managing static URL access according to an embodiment of the present invention.

FIG. 2 is a flowchart illustrating a method 200 arranged for managing static URL access according to an embodiment of the present invention. The method may be applied to the apparatus 100 shown in FIG. 1, and more particularly, to the aforementioned processing circuit 110 which executes the program code 110B through the aforementioned at least one processor. For example, by utilizing a computer program product, such as a CD-ROM which stores the program code 110B (especially the installation version thereof), the administrator of the storage system may install the program code 110B into the apparatus 100, wherein the computer program product includes the program code 110B (especially the installation version thereof), so as to instruct the aforementioned at least one processor to perform the method 200 shown in FIG. 2. Hence, the processing circuit 110 (especially the static URL access management module) is capable of controlling the operation of the electronic device, in order to perform the method shown in FIG. 2 based on the network service. However, this is merely for illustrative purposes, and not meant to be a limitation of the present invention. The method 200 is detailed as follows.

In step 210, based on the network service provided by the network control module 120, the processing circuit 110 receives a URL request from a browser running on another electronic device, wherein the URL request includes a static URL, and the static URL is used to access a specific web page on a specific web server.

In step 220, based on the network service provided by the network control module 120, the processing circuit 110 sends request information representative of the URL request to a control server, wherein the control server stores registered information of each web server of at least one web server (e.g., one or more web servers), and the at least one web server includes the specific web server. For example, the control server may be a server located outside the electronic device. However, this is merely for illustrative purposes, and not meant to be a limitation of the present invention. According to some modifications of this embodiment, the control server may be a server installed inside the electronic device, such as the aforementioned control server.

In step 230, based on the network service provided by the network control module 120, the processing circuit 110 receives response information corresponding to the request information from the control server, wherein the control server generates the response information according to the request information, and the response information indicates registered information of the specific web server. For example, the registered information of the specific web server is registered to the control server by the specific web server.

In practice, the registered information of the specific web server includes identification (ID) information of the specific web server, wherein the ID information may be the unique ID information of the specific web server, so as to be distinguished from other devices on the network. Further, the registered information of the specific web server may further include information related to the intranet. For example, the registered information of the specific web server may further include at least one local area network (LAN) internet protocol (IP) address. For another example, the registered information of the specific web server may further include at least one wide area network (WAN) IP address. Please note that, when the specific web server is connected to the network, the specific web server may automatically update the registered information (e.g., the ID information, the aforementioned at least one LAN IP address, and/or the aforementioned at least one WAN IP address) of the specific web server. More particularly, the specific web server sends the latest contents of the registered information to the control server, to update the registered information in the control server, so that the registered information in the control server maintains the latest contents thereof. In this way, when the portal server demands the registered information of the specific web server from the control server, the portal server may thereby obtain the latest contents of the registered information.

In step 240, based on the network service provided by the network control module 120, the processing circuit 110 redirects the browser to a test page, such as a JavaScript test page, to control the browser to perform a test operation according to the registered information of the specific web server to generate a test result, in order to selectively allow the browser to directly or indirectly access the specific web page. For example, if the test result indicates that the specific web server and the other electronic device are located in the same LAN or the same WAN, the processing circuit 110 allows the browser to directly access the specific web page; otherwise, the processing circuit 110 allows the browser to indirectly access the specific web page. More particularly, when the test result indicates that the specific web server and the other electronic device are not located in the same LAN and the same WAN, the processing circuit 110 utilizes the control server to create a reverse tunnel through the aforementioned at least one web server, to allow the browser to indirectly access the specific web page. For example, the control server 330 may notify the web server 340 after receiving a notification of the portal server 320, so as to utilize the web server 340 to create the reverse tunnel.

In practice, the reverse tunnel may be created by using the virtual private network (VPN) technique. However, this is merely for illustrative purposes, and not meant to be a limitation of the present invention. The detail operations of the reverse tunnel are known by one skilled in the art, and thus will be omitted here for brevity.

Please note that, in this embodiment, the JavaScript test page may be an example of the aforementioned test page. This is merely for illustrative purposes, and not meant to be a limitation of the present invention. According to some modifications of this embodiment, the test page may be a Flash test page which is a test page written in a Flash syntax.

According to this embodiment, based on the network service provided by the network control module 120, the processing circuit 110 may utilize the browser to set a cookie in the other electronic device, to record the test result. When receiving another URL request, including the static URL, from the browser (through the network control module 120), the processing circuit 110 may refer to the test result transmitted from the cookie of the browser, to skip the operation of redirecting the browser to the test page, so as to avoid repeatedly performing the test operation upon the static URL. Hence, for any URL requests including the static URL, the test operation may be performed only once to save user's time.

Figure 3:
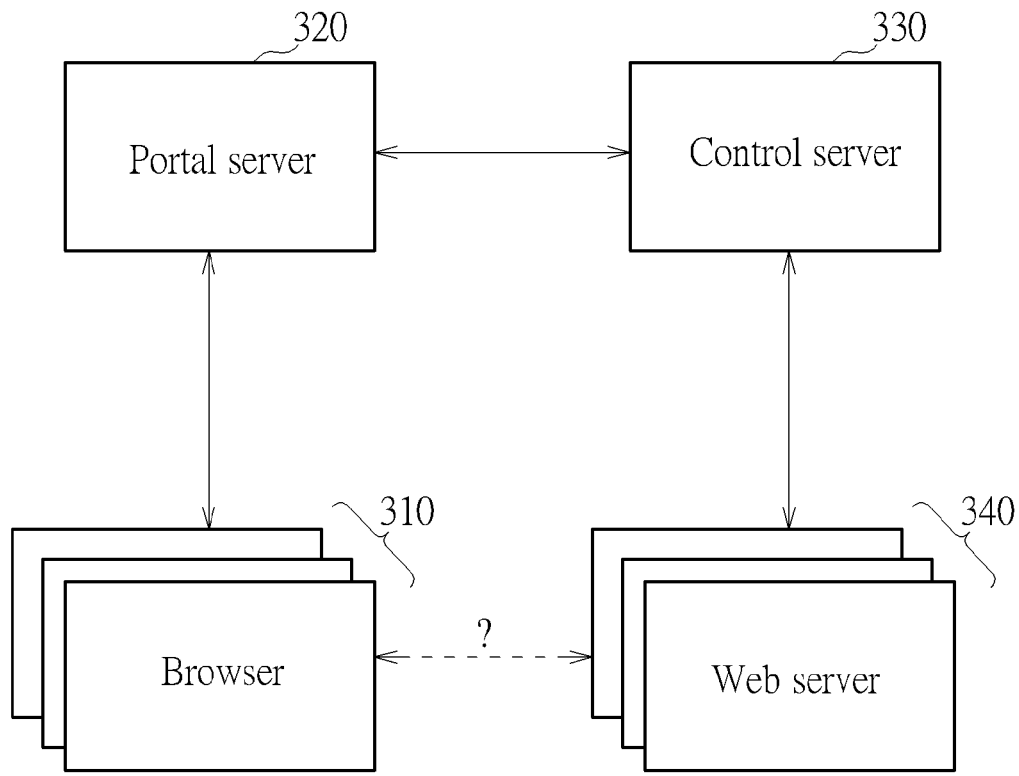
FIG. 3 is a diagram illustrating a control scheme involved by the method shown in FIG. 2 according to an embodiment of the present invention.

Please refer to FIG. 3, which is a diagram illustrating a control scheme involved by the method 200 shown in FIG. 2 according to an embodiment of the present invention. As shown in FIG. 3, the control scheme includes various parts, such as a set of browsers 310, a portal server 320, a control server 330 and a set of web servers 340. In this embodiment, the set of browsers 30 may include the browser mentioned in step 210. For example, the user interface of the set of browsers 310 may be implemented in the form of browser windows or browser pages, wherein the set of browsers 310 may be opened by one or more users. However, this is merely for illustrative purposes, and not meant to be a limitation of the present invention. Further, the portal server 320 may be an example of the portal server mentioned in the embodiment of FIG. 1 (or the modifications thereof), and the control server 330 may be an example of the control server mentioned in the embodiment of FIG. 2. Further, the set of web servers 340 may be an example of the aforementioned at least one web server, wherein the set of web servers 340 may include the specific web server.

Based on the method 200 shown in FIG. 2, the portal server 320 may redirect one browser (e.g., the browser mentioned in step 210) in the set of browsers 310 to the test page such as the JavaScript test page, in order to control the browser to perform a test operation according to the registered information of one web server (e.g., the specific web server mentioned in step 210) of the set of web servers 340 to thereby generate a corresponding test result (e.g., the test result mentioned in step 240), so as to selectively allow this browser to directly or indirectly access a target web page (e.g., the specific web page mentioned in step 210) with a particular static URL. As shown in FIG. 3, a symbol "?" is depicted between the set of browsers 310 and the set of web servers 340, for representing the test operation. Further, the path between the set of browsers 310 and the set of web servers 340 is depicted in a dotted line. This dotted line represents the following situation: according to a test result of the test operation (e.g., the test result mentioned in the step 240), a direct or indirect web page access might occur between one of the set of browsers 310 and one of the set of web servers 340.

According to this embodiment, the control server 330 provides a registration service to the set of web servers 340, to allow the set of web servers 340 to register respective registered information. Please note that, the registered information of any web server (particularly each web server) of the set of web servers 340 may include the ID information of this web server along with at least one LAN IP address and/or at least one WAN IP address. Further, the control server 330 may maintain a connection between the control server 330 and this web server, and may create a reverse tunnel leading to this web server based on this connection through this web server. For example, the control server 330 may notify this web server after receiving a notification of the portal server 320, so as to utilize this web server to create this reverse tunnel. After the reverse tunnel leading to this web server is created, the control server 330 informs the portal server 320 of the location (e.g., a dynamic URL) of this reverse tunnel, thus allowing the reverse tunnel to be used if needed. Further, the portal server 320 and the control server 330 may dynamically create a connection between the portal server 320 and the control server 330 for operating the control scheme.

Figure 4:
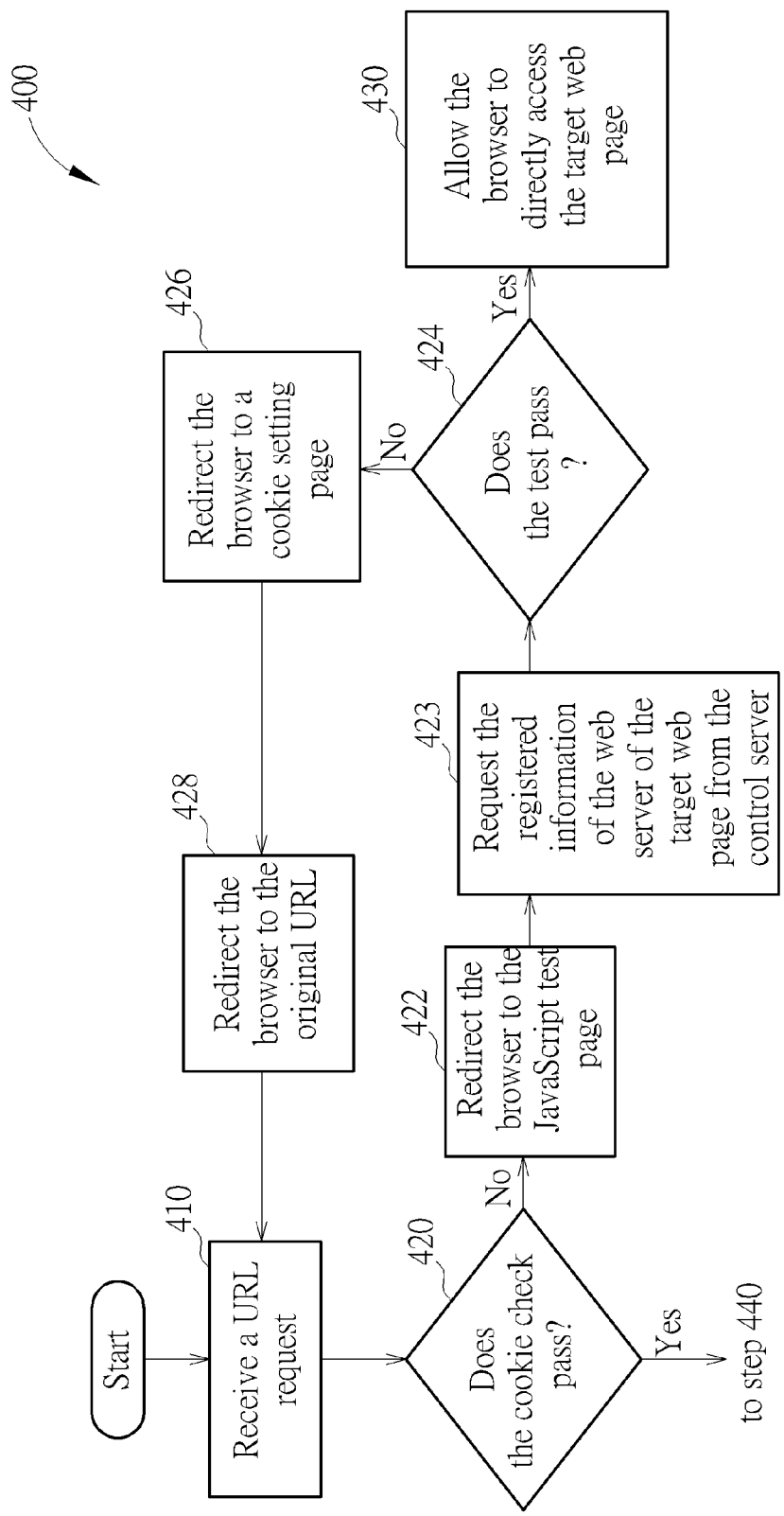
FIG. 4 is a diagram illustrating part of an operation of a workflow involved by the control scheme shown in FIG. 3 according to an embodiment of the present invention.
Figure 5:
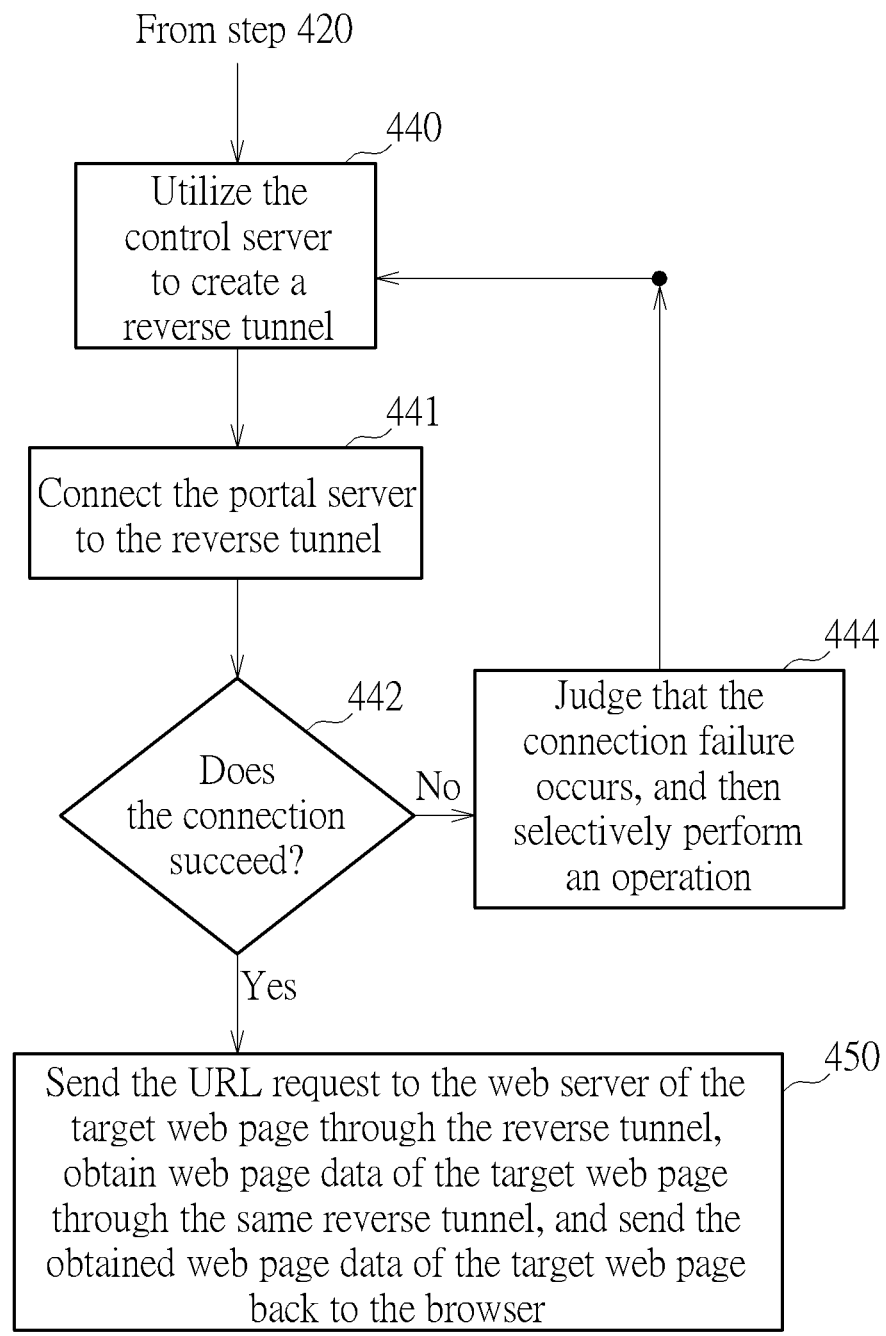
FIG. 5 is a diagram illustrating another part of the operation of the workflow shown in the embodiment of FIG. 4.

Please refer to FIG. 4 in conjunction with FIG. 5. FIG. 4 is a diagram illustrating part of an operation of a workflow 400 involved by the control scheme shown in FIG. 3 according to an embodiment of the present invention. FIG. 5 is a diagram illustrating another part of the operation of the workflow 400 shown in the embodiment of FIG. 4.

In step 410, when the particular browser (e.g., the browser mentioned in step 210) sends a URL request, the portal server 320 receives this URL request, wherein this URL includes a corresponding static URL. For example, if this URL request is the URL request mentioned in step 210, then the target web page is the specific web page mentioned in step 210, the web server of the target web page (i.e., the web server to which the target web page belongs) is the specific web server mentioned in step 210, and the aforementioned static URL is the static URL mentioned in step 210.

In step 420, after receiving this URL request, the portal server 320 performs at least one cookie check. More particularly, the portal server 320 checks whether any cookie corresponding to this URL request exists. For example, if a cookie corresponding to this URL request exists, the portal server 320 further checks whether this cookie records the test result mentioned in the embodiment shown in FIG. 3. For another example, under a situation that the existence of the cookie corresponding to the URL request may represent the test result, the portal server 320 may directly determine whether the test result indicates that "the web server of this target web page and the other electronic device are located in the same LAN or the same WAN" according to whether the cookie corresponding to this URL request exists. For another example, under the situation that the existence of the cookie corresponding to the URL request may represent the test result, the portal server 320 may directly determine whether the test result indicates that "the web server of this target web page and the other electronic device are not located in the same LAN and the same WAN" according to whether the cookie corresponding to this URL request exists. However, this is merely for illustrative purposes, and not meant to be a limitation of the present invention.

In practice, the aforementioned at least one cookie check may be simplified, so as to save the system resource and the user's time. For better understanding, it is assumed that this URL request is the URL request mentioned in step 210, and the target web page is the specific web page in step 210. For example, under the situation that the existence of the cookie corresponding to the URL request may represent the test result, the portal server 320 may directly determine whether the test result indicates that "the specific web server and the other electronic device are not located in the same LAN and the same WAN" according to whether the cookie corresponding to this URL request exists. Hence, in step 420, when the cookie corresponding to this URL request exists (which means that the test result indicates the specific web server and the other electronic device are not located in the same LAN and the same WAN in this example), i.e., the cookie check passes, the flow goes to step 440; otherwise (i.e., "the web server of this target web page and the other electronic device are located in the same LAN or the same WAN" in this example), the flow goes to step 422.

In step 422, the portal server 320 controls this browser (i.e., the browser mentioned in step 410) to be redirected to the JavaScript test page.

In step 423, the portal server 320 requests the registered information of the web server of the target web page from the control server 330. Please note that, in this embodiment, step 423 is performed after step 422. However, this is merely for illustrative purposes, and not meant to be a limitation of the present invention. According to some modifications of this embodiment, step 422 may be performed after step 423.

In step 424, through utilizing the JavaScript test page, the portal server 320 controls this browser to perform the test operation according to the registered information of this web server, to generate a corresponding test result. If the test passes (which means that "the web servers and the electronic device performing this browser are located in the same LAN or the same WAN" in this example), the flow goes to step 430; otherwise (i.e., "the web server and the electronic device performing this browser are not located in the same LAN and the same WAN" in this example), the flow goes to step 426.

For better understanding, it is assumed that this URL request is the URL request mentioned in step 210, and the target web page is the specific web page in step 210. Hence, in step 424, if the test passes, it represents that the test result indicates that "the specific web server and the other electronic device are located in the same LAN or the same WAN"; and if the test does not pass, it represents that the test result indicates that "the specific web server and the other electronic device are not located in the same LAN and the same WAN".

In step 426, the portal server 320 controls this browser to be redirected to a cookie setting page for setting a corresponding cookie.

In step 428, the portal server 320 controls this browser to be redirected to the original URL, i.e., the corresponding static URL mentioned in step 410. Hence, in FIG. 4, step 428 is shown pointing to step 410. However, this is merely for illustrative purposes, and not meant to be a limitation of the present invention. According to a modification of this embodiment, step 428 may be shown pointing to the path between steps 410 and 420 directly, which means that step 420 will be performed again right after step 428 is performed.

In step 430, the portal server 203 allows this browser to directly access the target web page. For example, if the URL request mentioned in step 410 is the URL request mentioned in step 210, then the target web page is the specific web page mentioned in step 210.

In step 440, the portal server 320 utilizes the control server 330 to create a reverse tunnel through the aforementioned at least one web server, such as the reverse tunnel of the embodiment shown in FIG. 2. For example, the control server 330 may notify the web server 340 after receiving a notification (e.g., the notification containing the test result, or the notification representing the test result)of the portal server 320, so as to utilize the web server 340 to create the reverse tunnel.

In step 441, the portal server 320 connects to the reverse tunnel, especially maps the static URL to the dynamic URL.

In step 442, the portal server 320 checks whether the operation of connecting the reverse tunnel succeeds. If the operation of connecting the reverse tunnel succeeds, the flow goes to step 450; otherwise, the flow goes to step 444.

In step 444, the portal server 320 judges that the connection failure occurs (i.e., the operation of connecting the reverse tunnel does not succeed), and then selectively performs certain operation(s). For example, the portal server 320 may detect its network state. For another example, the portal server 320 may check whether the connection between the portal server 320 and the control server 330 is lost, so as to determine whether to attempt to restore the connection. For another example, the portal server 320 may send commands to the control server 330, to check whether the reverse tunnel between the control server 330 and the web server (i.e., the specific web server mentioned in step 210) belonging to the target web page is broken, wherein when this reverse tunnel is broken, the portal server 320 may send commands to the control server 330, to control the control server 330 to re-create a latest reverse tunnel between the control server 330 and this web server (i.e., anew create the dynamic URL) through this web server. Then, the portal server 320 re-maps the static URL to the latest reverse tunnel (e.g., the dynamic URL). However, this is merely for illustrative purposes, and not meant to be a limitation of the present invention. According to a modification of this embodiment, the path directly pointing to step 444 from step 442 may be changed to directly point to step 440. That is, step 444 may be skipped/omitted.

In step 450, the portal server 320 sends the URL request mentioned in step 410 to the web server of the target web page through the reverse tunnel mentioned in step 440, obtains web page data of the target web page through the same reverse tunnel, and sends the obtained web page data of the target web page back to this browser. Hence, through utilizing the reverse tunnel, the portal server 320 allows this browser to indirectly access the target web page. For example, if the URL request mentioned in step 410 is the URL request mentioned in step 210, then the target web page is the specific web page mentioned in step 210.

According to this embodiment, the operation path of the loop in FIG. 4 (i.e., the loop including steps 420, 422, . . . , 428) may be selectively skipped/omitted through the cookie check in step 420 (if the cookie test passes in step 420). Hence, for any URL request including the same static URL (e.g., the static URL mentioned in step 210), the test operation may be performed only once to save user's time.

Further, the static URL may include a fixed URL pattern, wherein the fixed URL pattern may include identification information of the web server to which the user wants to connect, and may include the web page path which the user wants to access. For example, the URL pattern may be http://SERVER_ID.domain/URL_PATH, where the symbol "SERVER_ID" represents the identification information of this web server, the symbol "domain" represents the domain name of the portal server 320, and the symbol "URL_PATH" represents the web page path which the user wants to access.

Please note that, the network administrator or an associated person of the portal server 320 may apply for the domain name for the portal server 320 in advance, to make the domain name in the URL pattern only used by the portal server 320. Hence, any static URL including the domain name is directed to the portal server 320. Based on the method 200 shown in FIG. 2, when the user utilizes this browser in step 410 (e.g., the browser mentioned in step 210) to input a static URL conforming to the URL pattern, this browser sends a corresponding URL request to the portal server 320. Hence, the portal server 320 may be operated according to the workflow 400 for the static URL conforming to the URL pattern.

According to some modifications of this embodiment, in order to perform the test operation, the portal server 320 may request related information from the control server 330, such as the identification information and the corresponding IP address (e.g., the aforementioned at least one LAN IP address or the aforementioned WAN IP address) mentioned in the embodiment shown in FIG. 3. Through utilizing the test page such as the JavaScript test page (i.e., a test page written in JavaScript), the portal server 320 may put the aforementioned related information on the browser mentioned in step 410, to make this browser perform this JavaScript.

If this URL request mentioned in step 410 is the URL request mentioned in step 210, the target web page is the specific web page mentioned in step 210, and the web server of the target web page is the specific web server mentioned in step 210, then this JavaScript will include the registered information of the specific web server. Hence, the browser performs the test operation to confirm whether the specific web server and the other electronic device are located in the same LAN or the same WAN.

For example, when the test result indicates that the specific web server and the other electronic device are located in the same LAN or the same WAN, the portal server 320 may redirect the browser to the specific web server, to allow the browser to directly access the specific web page. For another example, when the test result indicates that the specific web server and the other electronic device are not located in the same LAN and the same WAN, the portal server 320 may utilize the reverse tunnel created by the control server 330 through the aforementioned at least one web server, to provide an access service to the browser, so as to allow the browser to indirectly access the specific web page. In practice, regarding creating the reverse tunnel, the control server 330 may notify the web server 340 after receiving a notification of the portal server 320, so as to utilize the web server 340 to create the reverse tunnel. Hence, through controlling the web server 340, the control server 330 may indirectly create the reverse tunnel.

Please note that, the browser is not informed of where the aforementioned reverse channel is. Under this situation, the portal server 320 may automatically transmit information to the aforementioned reverse tunnel for the browser, so as to make the information be transmitted to the specific web server through the aforementioned reverse tunnel. More particularly, when the browser sends a request (e.g., the browser transmits the URL request mentioned in step 210 again, or the URL request transmitted by the browser may include static URLs of any web pages on the specific web server), the portal server 320 may automatically transmit this request to the aforementioned reverse tunnel which has already been created. Since the aforementioned reverse tunnel has been prepared, the information transmission between the control server 330 and the specific web server is thereby provided.

For better understanding, the specific web server may be viewed as an example of any web server in the set of web servers 340. Similarly, the descriptions about the specific web server in the embodiment shown in FIG. 4 and the modifications thereof may be also applied to each web server in the set of web servers 340. Further, the reason why the test operation mentioned in step 240 is designed to be performed on the browser is as follows.

First, the browser may be located behind the firewall. However, in typical situations, the portal server 320 and the browser are not located behind the same firewall. Hence, even if the portal server 320 is capable of connecting to one web server, the browser may not be capable of connecting to this web server. Further, the browser and one web server in the set of web servers 340 may be located in the same LAN; however, this web server and the portal server 320 are not located in the same LAN in typical situations. Hence, in this situation, if the browser attempts to connect to the LAN IP address, the browser may be able to connect to the LAN IP address, but the portal server 320 may not be able to connect to the LAN IP address. Hence, the test operation should be performed on the browser so as to generate a more precise test result. Further, when the test operation is running, the registered information obtained by the browser includes the identification information of this web server. Hence, the method, apparatus and computer program product are capable of ensuring the user's information security.

In practice, a cross-domain issue maybe encountered. This is because URLs of this portal server and this web server are not located in the same domain under typical situations. To ensure the user's information security, the browser may not allow any cross-domain request. In order to overcome the barrier of the cross-domain issue, some technical schemes may be applied to some implementation details of this web server (e.g., the specific web server mentioned in step 210). For example, one of these technical schemes may be JavaScript Object Notation with Padding (JSON with Padding or JSONP), wherein this web server conforms to the JSONP specification. For another example, another of these technical schemes may be the Cross-Origin Resource Sharing (CORS) as specified in the Hyper-Text Markup Language 5 (HTML5) standard, wherein this web server, such as the specific web server, may conform to the CORS specification.

In general, most newly-developed web servers support the CORS service or function, thereby ensuring the user's information security. As to the web servers which do not provide CORS service, the test operation may be performed each time, thus ensuring the user's information security.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for managing static Uniform Resource Locator (URL) access, the method applied to a portal server and comprising the following steps:
   receiving a URL request, by the portal server, from a browser running on another electronic device, wherein the URL request comprises a static URL, and the static URL is utilized for accessing a specific web page on a specific web server;
   sending request information representing the URL request, by the portal server, to a control server, wherein the control server stores registered information of each web server of at least one web server, and the at least one web server comprises the specific web server;
   receiving response information corresponding to the request information, by the portal server, from the control server, wherein the control server generates the response information according to the request information, and the response information indicates registered information of the specific web server; and
   selectively allowing, by the portal server, the browser to directly or indirectly access the specific web page by redirecting the browser to a test page so that the browser performs a test operation according to the registered information of the specific web server and generates a test result,
   wherein when the test result indicates that the web server and the other electronic device are located in a same local area network (LAN) or a same wide area network (WAN), the portal server allowing the browser to directly access the specific web page without needing to create a reverse tunnel, and when the test result indicates that the web server and the other electronic device are not located in a same local area network (LAN) or a same wide area network (WAN), the portal server allowing the browser to indirectly access the specific web page by utilizing the control server to create the reverse tunnel through the at least one web server.

2. The method of claim 1, further comprising:
   utilizing the browser to set a cookie in the other electronic device, to record the test result.

3. The method of claim 2, further comprising:
   when receiving another URL request comprising the same static URL from the browser, skipping the step of redirecting the browser to the test page, to avoid repeatedly performing the test operation upon the static URL.

4. The method of claim 1, wherein the registered information of the specific web server is registered to the control server by the specific web server.

5. The method of claim 4, wherein when the specific web server is connected to a network, the specific web server sends latest contents of the registered information to the control server, to update the registered information in the control server.

6. The method of claim 1, wherein the registered information of the specific web server comprises identification (ID) information of the specific web server.

7. The method of claim 6, wherein the registered information of the specific web server further comprises at least one local area network (LAN) internet protocol (IP) address.

8. The method of claim 6, wherein the registered information of the specific web server further comprises at least one wide area network (WAN) internet protocol (IP) address.

9. The method of claim 1, wherein the test page is a JavaScript test page or a Flash test page.

10. The method of claim 1, wherein the specific web server conforms to a JavaScript Object Notation with Padding (JSONP) specification, or a Cross-Origin Resource Sharing (CORS) specification.

11. A computer program product, comprising a program code which is arranged to instruct at least one processor to perform the following steps:
receiving a URL request from a browser running on another electronic device, wherein the URL request comprises a static URL, and the static URL is utilized for accessing a specific web page on a specific web server;
sending request information representing the URL request to a control server, wherein the control server stores registered information of each web server of at least one web server, and the at least one web server comprises the specific web server;
receiving response information corresponding to the request information from the control server, wherein the control server generates the response information according to the request information, and the response information indicates registered information of the specific web server; and
selectively allowing the browser to directly or indirectly access the specific web page by redirecting the browser to a test page so that the browser performs a test operation according to the registered information of the specific web server and generates a test result,
wherein when the test result indicates that the web server and the other electronic device are located in a same local area network (LAN) or a same wide area network (WAN), allowing the browser to directly access the specific web page without needing to create a reverse tunnel, and when the test result indicates that the web server and the other electronic device are not located in a same local area network (LAN) or a same wide area network (WAN), allowing the browser to indirectly access the specific web page by utilizing the control server to create the reverse tunnel through the at least one web server.

12. An apparatus for managing static Uniform Resource Locator (URL) access, the apparatus comprising at least a portion of a portal server, the apparatus comprising:
a network control module, arranged to provide a network service to the apparatus; and
a processing circuit, coupled to the network control module, the processing circuit arranged to control an operation of the portal server to perform a method based on the network service, wherein the processing circuit comprises at least one processor, and the method comprises following steps:
receiving a URL request, by the portal server, from a browser running on another electronic device, wherein the URL request comprises a static URL, and the static URL is utilized for accessing a specific web page on a specific web server;
sending request information representing the URL request to a control server, wherein the control server stores registered information of each web server of at least one web server, and the at least one web server comprises the specific web server;
receiving response information corresponding to the request information from the control server, wherein the control server generates the response information according to the request information, and the response information indicates registered information of the specific web server; and
selectively allowing the browser to directly or indirectly access the specific web page by redirecting the browser to a test page so that the browser performs a test operation according to the registered information of the specific web server and generates a test result, wherein when the test result indicates that the web server and the other electronic device are located in a same local area network (LAN) or a same wide area network (WAN), the portal server allowing the browser to directly access the specific web page without needing to create a reverse tunnel, and when the test result indicates that the web server and the other electronic device are not located in a same local area network (LAN) or a same wide area network (WAN), the portal server allowing the browser to indirectly access the specific web page by utilizing the control server to create the reverse tunnel through the at least one web server.

13. The apparatus of claim 12, wherein the method further comprises:
utilizing the browser to set a cookie in the other electronic device, to record the test result.

14. The apparatus of claim 13, wherein the method further comprises:
when receiving another URL request comprising the same static URL from the browser, skipping the step of redirecting the browser to the test page, to avoid repeatedly performing the test operation upon the static URL.

15. The apparatus of claim 12, wherein the registered information of the specific web server is registered to the control server by the specific web server.

16. The apparatus of claim 15, wherein when the specific web server is connected to a network, the specific web server sends latest contents of the registered information to the control server, to update the registered information in the control server.

17. The apparatus of claim 12, wherein the registered information of the specific web server comprises identification (ID) information of the specific web server.

18. The apparatus of claim 17, wherein the registered information of the specific web server further comprises at least one local area network (LAN) internet protocol (IP) address.

19. The apparatus of claim 17, wherein the registered information of the specific web server further comprises at least one wide area network (WAN) internet protocol (IP) address.

* * * * *